United States Patent
Yan et al.

(10) Patent No.: US 8,533,536 B2
(45) Date of Patent: *Sep. 10, 2013

(54) MONITORING DATA CATEGORIZATION AND MODULE-BASED HEALTH CORRELATIONS

(75) Inventors: An Yan, Sammamish, WA (US); Wilson Li, Redmond, WA (US); Paulo Janotti, Issaquah, WA (US); Jon Avner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,916

(22) Filed: Jun. 28, 2012

(65) Prior Publication Data

US 2012/0271594 A1 Oct. 25, 2012

Related U.S. Application Data

(63) Continuation of application No. 12/141,056, filed on Jun. 17, 2008, now Pat. No. 8,230,269.

(51) Int. Cl.
*G06F 11/00* (2006.01)
(52) U.S. Cl.
USPC ............... 714/47.1; 714/25; 714/26; 714/37; 714/57
(58) Field of Classification Search
USPC ............... 714/25, 26, 32, 33, 37, 47.1, 47.3, 714/48, 57
See application file for complete search history.

(56) References Cited

U.S. PATENT DOCUMENTS

| | | | |
|---|---|---|---|
| 4,982,402 A | 1/1991 | Beaven et al. |
| 5,392,328 A | 2/1995 | Schmidt et al. |
| 5,548,715 A | 8/1996 | Maloney et al. |
| 5,646,864 A | 7/1997 | Whitney |
| 6,430,712 B2 | 8/2002 | Lewis |
| 6,484,203 B1 | 11/2002 | Porras et al. |
| 6,738,933 B2 | 5/2004 | Fraenkel et al. |
| 7,043,661 B2 | 5/2006 | Valadarsky et al. |
| 7,183,905 B2 | 2/2007 | Neubauer et al. |
| 7,237,137 B2 | 6/2007 | Goeller et al. |
| 7,257,744 B2 | 8/2007 | Sabet et al. |
| 7,305,325 B2 | 12/2007 | Kostyk et al. |
| 7,308,385 B2 | 12/2007 | Wegerich et al. |
| 7,526,670 B2 | 4/2009 | Lloyd et al. |
| 7,583,587 B2 | 9/2009 | Qiu et al. |

(Continued)

OTHER PUBLICATIONS

Plosk, et al., "Research Issues in Software Fault Categorization", ACM SIGSOFT Software Engineering Notes, vol. 32, No. 6, Nov. 2007, ACM.

(Continued)

*Primary Examiner* — Joseph D Manoskey

(57) ABSTRACT

Architecture for aggregating health alerts from a number of related components into a single aggregated health state that can be analyzed to isolate the component responsible for the fault condition. In a hierarchy of related components within various component groups in a computer system, a number of health indicators can indicate alerts occurring in one or more of the related components whereas the fault condition occurs in only one component upon which the other components depend. The health indicators of related components are aggregated into an aggregated health state for each component group. These aggregated health states are analyzed to identify the related component associated with a root cause of the alert condition for an affected component group.

19 Claims, 18 Drawing Sheets

(56) References Cited

U.S. PATENT DOCUMENTS

| | | |
|---|---|---|
| 7,640,457 B2 | 12/2009 | Erwin et al. |
| 8,161,323 B2 | 4/2012 | Kuchibhotla et al. |
| 2003/0204588 A1 | 10/2003 | Peebles et al. |
| 2004/0225530 A1 | 11/2004 | Bell et al. |
| 2005/0210331 A1* | 9/2005 | Connelly et al. ............ 714/26 |
| 2005/0262136 A1 | 11/2005 | Lloyd et al. |
| 2008/0016412 A1* | 1/2008 | White et al. ............ 714/48 |
| 2008/0109683 A1 | 5/2008 | Erwin et al. |
| 2009/0106605 A1 | 4/2009 | Kuchibhotla et al. |

OTHER PUBLICATIONS

Leszak, et al., "A Case Study in Root Cause Defect Analysis", Proceedings of the 22nd International Conference on Software Engineering, 2000, ACM.

* cited by examiner

MONITORING DATA CATEGORIZATION AND MODULE-BASED HEALTH CORRELATIONS

CROSS-REFERENCE OF RELATED APPLICATIONS

This application claims the benefit of, and priority to, previously filed U.S. patent application Ser. No. 12/141,056 entitled "Monitoring Data Categorization And Module-Based Health Correlations" filed on Jun. 17, 2008, the subject matter of which is hereby incorporated by reference in its entirety.

BACKGROUND

A monitoring solution can be used in software systems to check the data outputs and confirm whether these outputs are within acceptable parameters. In the event that the data is not within acceptable parameters, a monitoring alert can be issued to notify maintenance personnel of potential problems with the health of the system.

Software components are interdependent, and a fault condition with a single component can result in a cascade of fault conditions with a number of interrelated components in the system. Thus, a number of different alerts can be sounded for the same fault condition. These multiple alerts can become noise since action is required for only a single component, not each affected component. This noise can make it difficult for administrators to identify the root cause of the fault condition.

Noise can also arise from other sources. Multiple health indicators can be used to monitor the same issue from different perspectives in order to improve monitoring coverage or robustness. These health indicators can be useful individually, but can be redundant when the indicators all independently discover the issue at about the same time.

Additionally, while monitoring information can be useful for analyzing system performance, the information is not necessarily useful for alerting since only partial information about the problem is indicated. The administrators need not immediately work on the problem unless other indicators also raise alerts. Data of this type is not actionable and becomes noise if presented in the form of an alert. Many monitoring solutions today collect such "forensic" data to ease troubleshooting, though such data is typically presented in the form of an alert that can produce noise.

Noise can also occur if multiple valid alerts having different scope or severity are raised at about the same time. The lesser issues can make it difficult to isolate and identify the greater issues, thereby requiring extra time and effort by system administrators to ascertain the source of the problem.

Solutions for noise control are known in which specific correlation rules are written to describe relationships between individual health indicators to accommodate specific problem scenarios (e.g., certain problem alerts are issued upon certain concurrent combinations of health indicators). However, such solutions have drawbacks.

Since each alert condition needs its own rule, a large number of rules are required, and can still fail to accommodate every potential problem path. Additionally, different rules can correlate to the same health indicator, and if the rules are evaluated separately, the same problem can be reported multiple times. Further, a single health indicator can exist in multiple problem paths, and if a shared health indicator is updated or removed from the health model, all the associated rules need to be updated. Still further, such noise reduction solutions do not perform well if the components belong to a different team or product, since errors can be introduced by the foreign components. Probability-based noise reduction solutions are known for estimating statistical likelihoods for root cause candidate. However, it can be difficult to define good probability numbers for each cause-impact link, since the impact of changing one probability number is often not intuitive.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed herein for diagnosing the health of a computer system by aggregating multiple related alerts into a single alert, and systematically analyzing each alert to isolate a root cause, thereby allowing system administrators to directly resolve the problem. A health model represents a hierarchy of related components within various component groups of the computer system. Health indicators are generated to indicate an alert condition occurring in any the related components within the health model. These health indicators are aggregated into a single aggregated health state for each component group. The aggregated health states are then analyzed to identify a related component representing the root cause of the alert condition for an affected component group.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
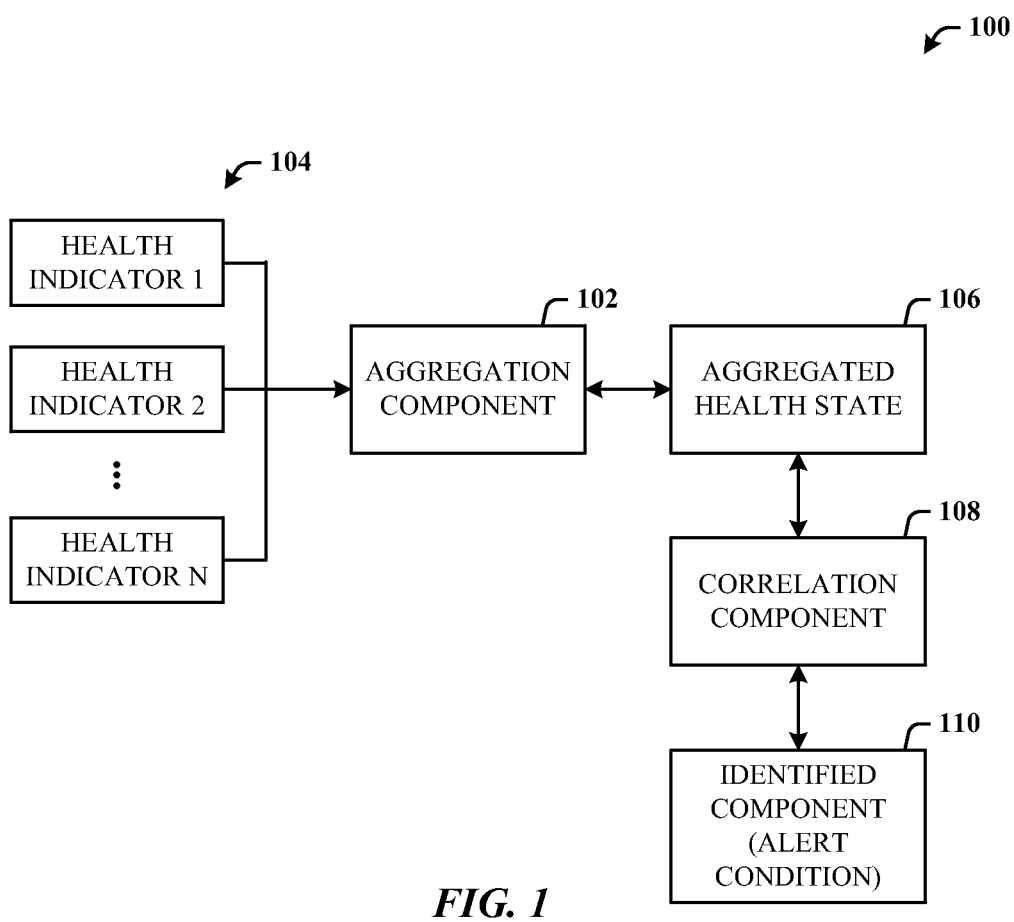
FIG. 1 illustrates a computer-implemented diagnostic system for aggregating multiple health alerts into a single aggregated health state.

The disclosed architecture relates to a computer diagnostic system for aggregating health alerts from a number of related components into a single aggregated health state that can be analyzed to isolate the component responsible for the fault condition. For example, in a hierarchy of related components within various component groups in a computer system, a number of health indicators can indicate alerts occurring in one or more of the related components whereas the fault condition occurs in only one component upon which the other components depend. The health indicators of related components are aggregated into an aggregated health state for each component group. The aggregated health states are analyzed to identify the related component associated with a root cause of the alert condition for an affected component group.

Reference is now made to the drawings, wherein like reference numerals are used to refer to like elements throughout. In the following description, for purposes of explanation, numerous specific details are set forth in order to provide a thorough understanding thereof. It can be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

FIG. 1 illustrates a computer-implemented diagnostic system 100 for aggregating multiple health alerts into a single aggregated health state. The system 100 includes an aggregation component 102 for aggregating health indicators 104 of related components of a computing system into an aggregated health state 106. The health indicators 104 are data from respective monitors or data sources that correspond to operational states of the components and indicate whether the components are functioning within suitable parameters.

One or more health indicators 104 can be obtained from the same component, different components on the same machine, or components across machine boundaries. Good "health" represents normal operation whereas poor "health" signifies an operational problem with the component. One or more of the health indicators 104 can be associated with a particular component to measure various parameters of the component.

The health indicators 104 used for monitoring and troubleshooting related data can fall into three general categories: key health indicators (KHIs), forensic data, and non-service impacting (NSI) issues. A key health indicator represents the client-perceived health of a component, measured against a service level agreement (SLA) that represents normal operation. Forensic data reveal some aspect of the service health from a different angle, and can be linked to other health indicators 104 to assist forensic analysis, but not be self alerted. NSI issues are lower priority problems that require attention but do not necessarily affect the service health.

The aggregated health state 106 is an aggregation of the health indicators 104 associated with related components. In the event that an alert is indicated in the health indicators 104 of each of the related components, the aggregated health state 106 will be represented as a single aggregated alert. In this way, noise in the system is reduced, as only one alert is presented rather than multiple alerts.

As also illustrated in FIG. 1, the system 100 includes a correlation component 108 for analyzing the aggregated health state 106 to identify a related identified component 110 having an alert condition. Since components in the system can be interdependent, the correlation component 108 analyzes each of the health indicators 104 in the aggregated health state 106 to ascertain the identified component 110 responsible for creating the alert condition in the other components that depend on the identified component 110.

Correlation is generally associated with a time window. Health indication events that occur outside of the time window are not regarded as related to the same problem. The time window can be pre-defined based on the specific characteristics of the services, past experience, and heuristics, for example. The correlation component 108 outputs a correlated alert and the health indicators 104 used in correlation are linked to the correlated alert so that all available information can be used in diagnosis and evaluation. Such information can be useful in "forensic analysis," as explained in detail hereinbelow.

Figure 2:
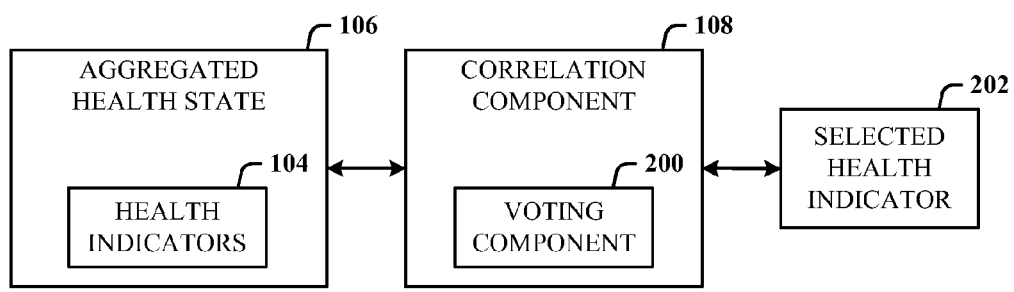
FIG. 2 illustrates exemplary aspects of a voting component used with a correlation component in a computer-implemented diagnostic system.

FIG. 2 illustrates exemplary aspects of a voting component 200 used with the correlation component 108 in the computer-implemented diagnostic system 100. The voting component 200 selects a health indicator 104 that defines the aggregated health state 106 based on freshness or voting weight. The voting component 200 selects one of the health indicators 104 from a plurality of key health indicators detecting the health of a component, to decide which one is better to define the aggregated health state 106 of the component.

In an example where two KHIs monitor the health of an email component, the first KHI compares average response time of client requests to a threshold. The second KHI runs a diagnostic tool to periodically sample the latency to a test mailbox. Each KHI can cast a "green" vote indicating the component is healthy, or a "red" vote indicating the component has a problem. If the votes conflict, then the voting component 200 decides which vote wins.

As mentioned hereinabove, freshness of the data and vote weight are factors determined by the voting component 200. Freshness is measured by a time window rather than precise timestamps. Freshness accounts for latency in propagation of the root cause problem through a hierarchy of dependent components. There is also latency due to the monitoring system detecting the problem and reporting it back. The correlation time window can be pre-defined based on specific characteristics of the components and the monitor system efficiency, in addition to past experience and heuristics. Vote weight considers the relative importance or significance of the KHIs and selects a KHI deemed to be most relevant to the aggregated health state 106.

Figure 3:
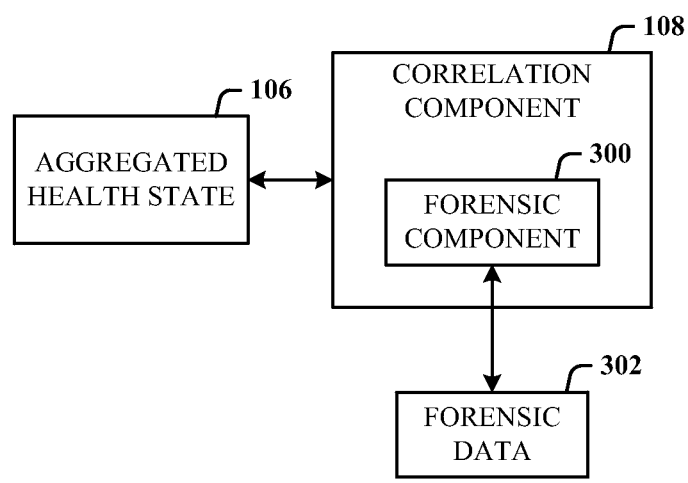
FIG. 3 illustrates exemplary aspects of a forensic component used with a correlation component in a computer-implemented diagnostic system.

FIG. 3 illustrates exemplary aspects of a forensic component 300 used with the correlation component 108 in the computer-implemented diagnostic system 100. The correlation component 108 includes the forensic component 300 for linking forensic data 302 to the aggregated health state 106. The forensic data 302 can make seemingly unrelated issues appear relevant to the KHI issue if all the issues occur about the same time. Linking detected forensic data 302 to the defining KHI (e.g., the winner KHI in the voting process) can simplify the health model and provide detailed additional information as to the health state of the system.

Figure 4:
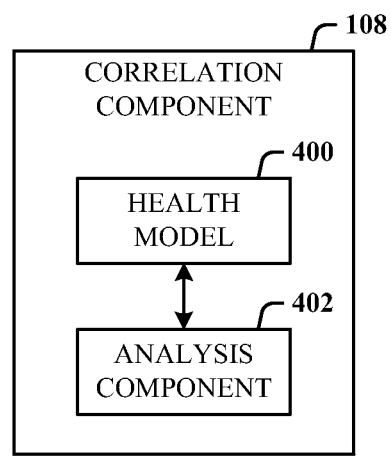
FIG. 4 illustrates exemplary aspects of a health model and analysis component used with a correlation component in a computer-implemented diagnostic system.

FIG. 4 illustrates exemplary aspects of a health model 400 and analysis component 402 used with the correlation component 108 in the computer-implemented diagnostic system 100. The correlation component 108 includes the health model 400 which represents a hierarchy of related components. The analysis component 402 is also included for analyzing the aggregated health state 106 of the health model 400 to identify a related component having a root cause of the alert condition.

The health model 400 models components into class hierarchies linked by dependency or containment relationships. The health indicators 104 monitor components at each level in the class hierarchy. Problems that occur in a lower level component affect the health of higher level components that depend on the lower level component. Therefore, the health indicators 104 for the higher level components will also indicate an alert condition. The aggregated health state 106 corresponding to the health model 400 identify the lowest level component upon which the others depend. Thus, the alert condition will correspond to one of the health indicators 104 closest to the root cause, at the lowest level in the problem path.

Figure 5:
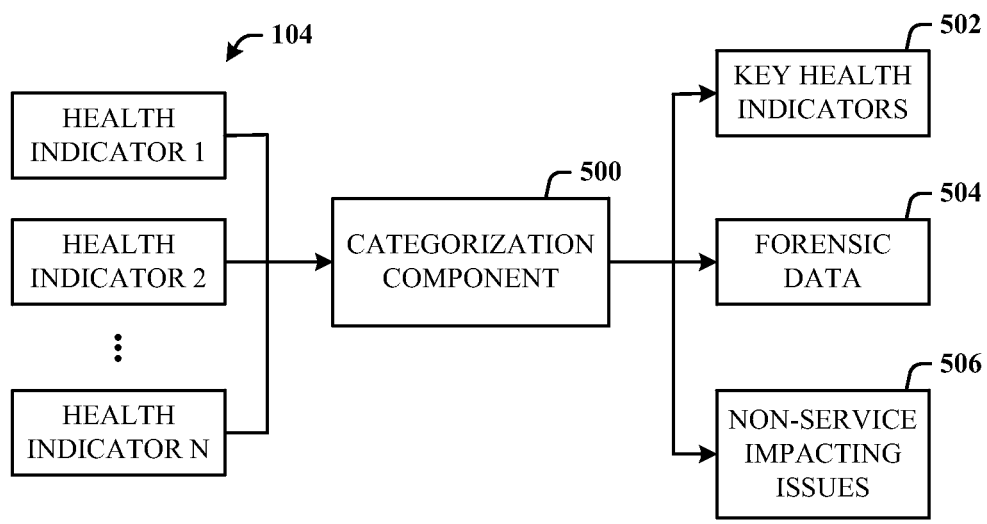
FIG. 5 illustrates exemplary aspects of a categorization component used with a computer-implemented diagnostic system.

FIG. 5 illustrates exemplary aspects of a categorization component 500 used with the computer-implemented diagnostic system 100. The categorization component 500 is used for categorizing one or more of the health indicators 104 into key health indicators 502, forensic data 504, and non-service impacting issues 506. The categorization component 500 can be an intermediate component between the health indicators 104 and the aggregation component 102, further to the embodiment of FIG. 1. In categorizing the health indicators 104 in this manner, the categorization component 500 enables the functions of the voting component 200, the forensic component 300, the health model 400, and the analysis component 402, as described hereinabove.

Figure 6:
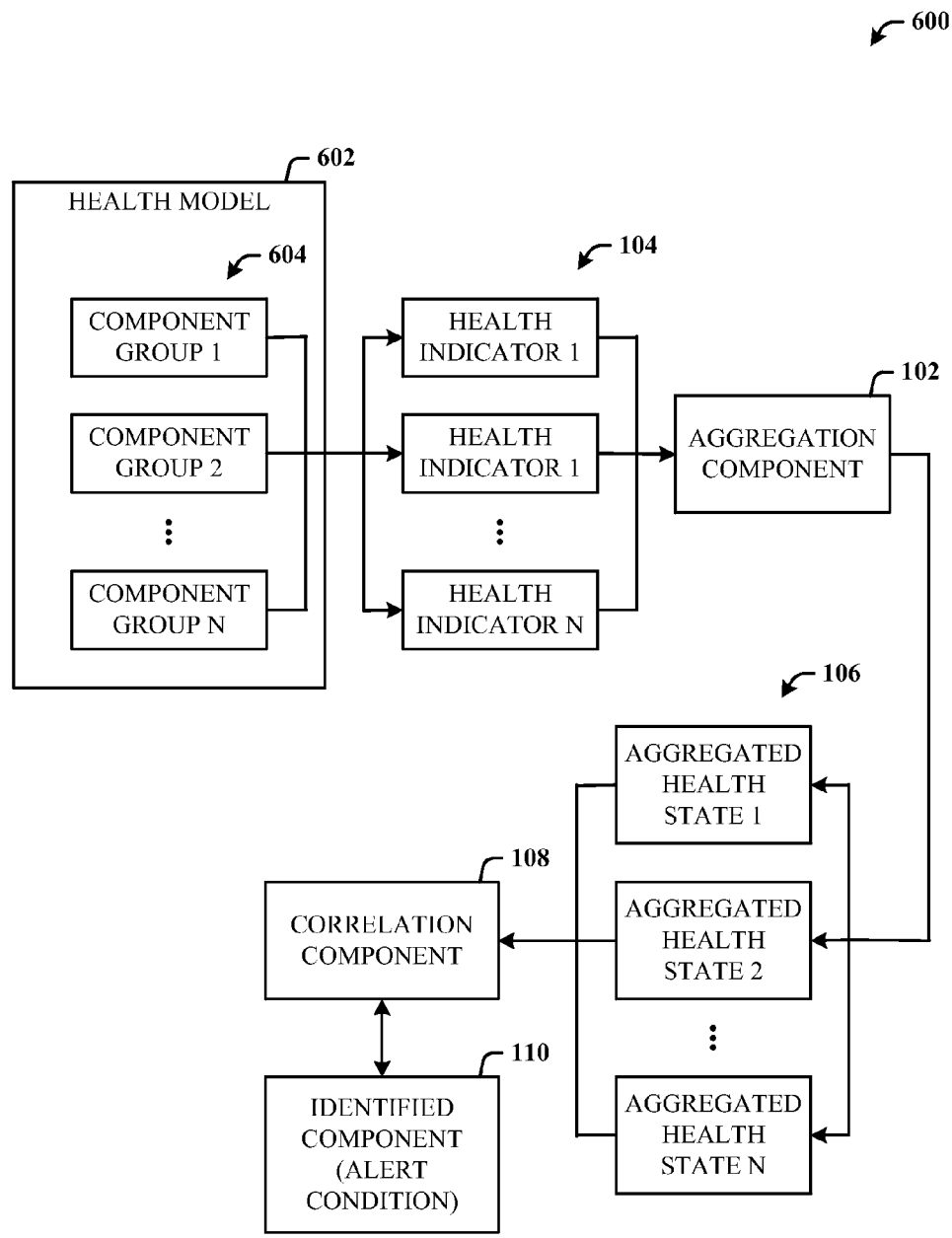
FIG. 6 illustrates an alternative embodiment of a computer-implemented diagnostic system.

FIG. 6 illustrates an alternative embodiment of a computer-implemented diagnostic system 600. A health model 602 is provided for representing a hierarchy of related components within component groups 604 in a computer system. Each of the component groups 604 includes a set of components, as will be explained in greater detail hereinbelow. In this way, the system 600 can monitor the health of complex systems having several groups of components.

As also shown in FIG. 6, a plurality of health indicators 104 are provided for indicating an alert condition of the related components within the health model 602. One or more of the health indicators 104 can correspond to any related component in any of the component groups 604, and more than one of the health indicators 104 can be associated with a single related component from one of the component groups 604.

FIG. 6 also shows the aggregation component 102 for aggregating the health indicators 104 of related components into the aggregated health state 106 for each of the component groups 604. The aggregated health state 106 represents an aggregation of the health indicators 104 associated with related components in each of the component groups 604.

Thus, the aggregated health state 106 will issue a single aggregated alert for each of the component groups 604 in the health model 602. Thus, a small number of relevant alerts are generated for a complex system, thereby reducing noise in the system.

The embodiment of FIG. 6 also includes the correlation component 108 for analyzing the aggregated health state 106 of each of the component groups 604 in the health model 602. The correlation component 108 identifies the related identified component 110 associated with a root cause of the alert condition for an affected component group.

It is to be appreciated that the system 600 can also include the categorization component 500 shown hereinabove with respect to FIG. 5. As with that embodiment, the categorization component 500 categorizes the health indicators 104 into key health indicators 502, forensic data 504, and non-service impacting issues 506.

Figure 7:
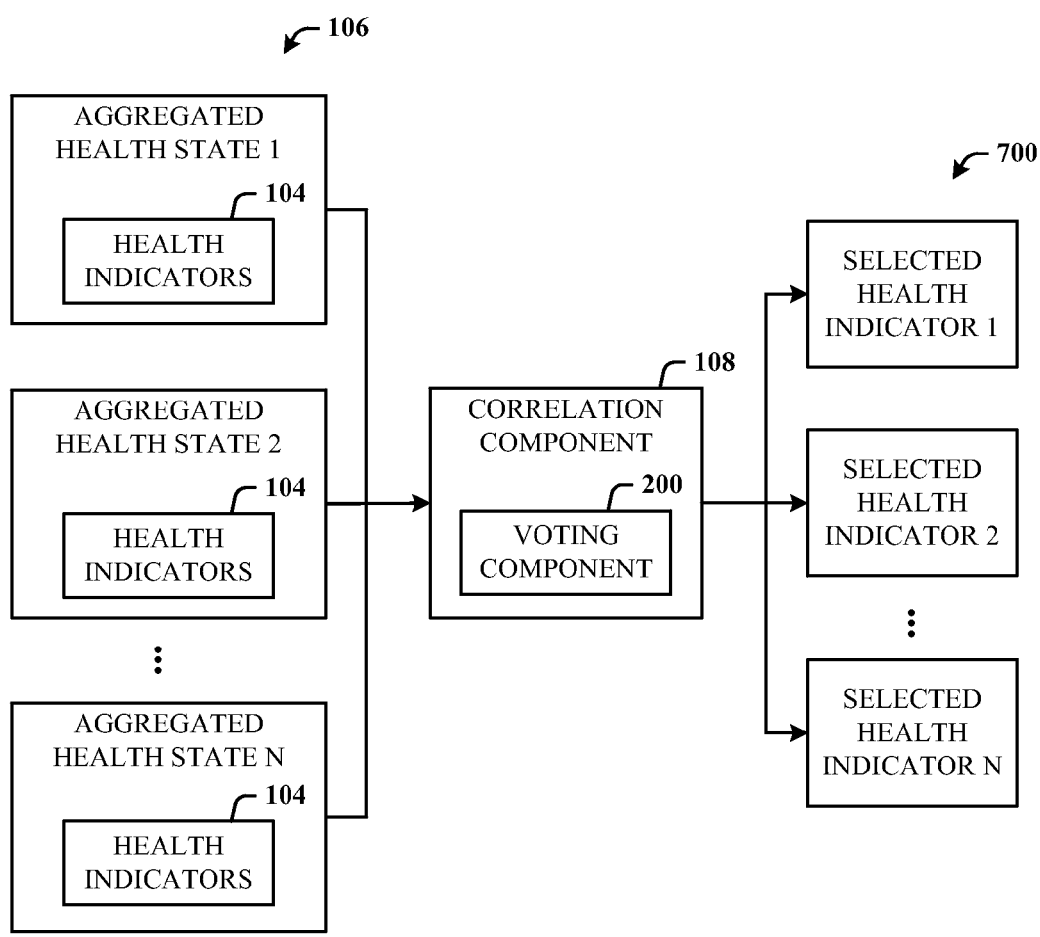
FIG. 7 illustrates an alternative embodiment of a voting component used with a correlation component in a computer-implemented diagnostic system.

FIG. 7 illustrates an alternative embodiment of the voting component 200 used with the correlation component 108 in the computer-implemented diagnostic system 600. The voting component 200 selects a selected aggregated health indicator from each aggregated health state 106 corresponding to each of the component groups 604 thereby creating a set of selected health indicators 700. This selection is based on a freshness factor, alternatively or in addition to a voting weight factor, in order to define the aggregated health state 106 of each of the component groups 604.

Figure 8:
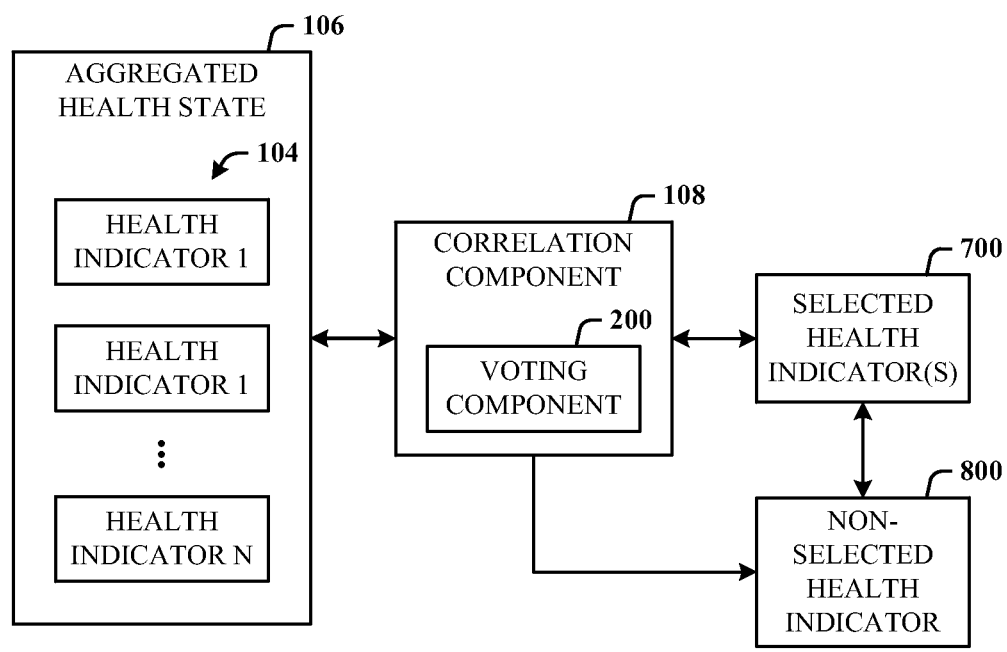
FIG. 8 illustrates a further alternative embodiment of a voting component used with a correlation component in a computer-implemented diagnostic system.

FIG. 8 illustrates a further alternative embodiment of the voting component 200 used with the correlation component 108 in the computer-implemented diagnostic system 600. A non-selected aggregated health indicator 800 is linked to one of the selected health indicators 700 in the aggregated health state 106 as a forensic health indicator. As described hereinabove with respect to the system 100 of FIG. 1, the voting component 200 selects a "winner" KHI to define the aggregated health state 106. The content of the "loser" KHIs can also be linked to the winner KHI as the forensic data 302 used by the forensic component 300, as indicated in FIG. 3.

Figure 9:
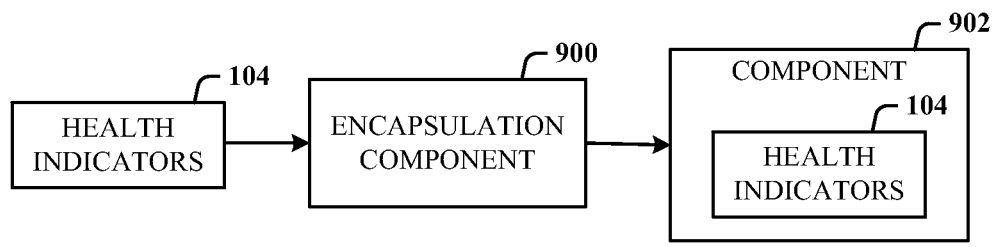
FIG. 9 illustrates exemplary aspects of an encapsulation component used with a computer-implemented diagnostic system.

FIG. 9 illustrates exemplary aspects of an encapsulation component 900 used with the computer-implemented diagnostic system 600. The encapsulation component 900 encapsulates the health indicators 104 of each component 902 within a component boundary. The encapsulation component 900 allows health monitoring of each component 900 to be done within the component boundary, and enables the aggregated health of the components to be monitored for root cause analysis to determine whether the service level agreement between components is broken.

Encapsulation simplifies authoring of the correlation relations between components 902 since the components 902 can be treated as black boxes without calling out component functions or creating specific rules for individual component health issues.

Figure 10:
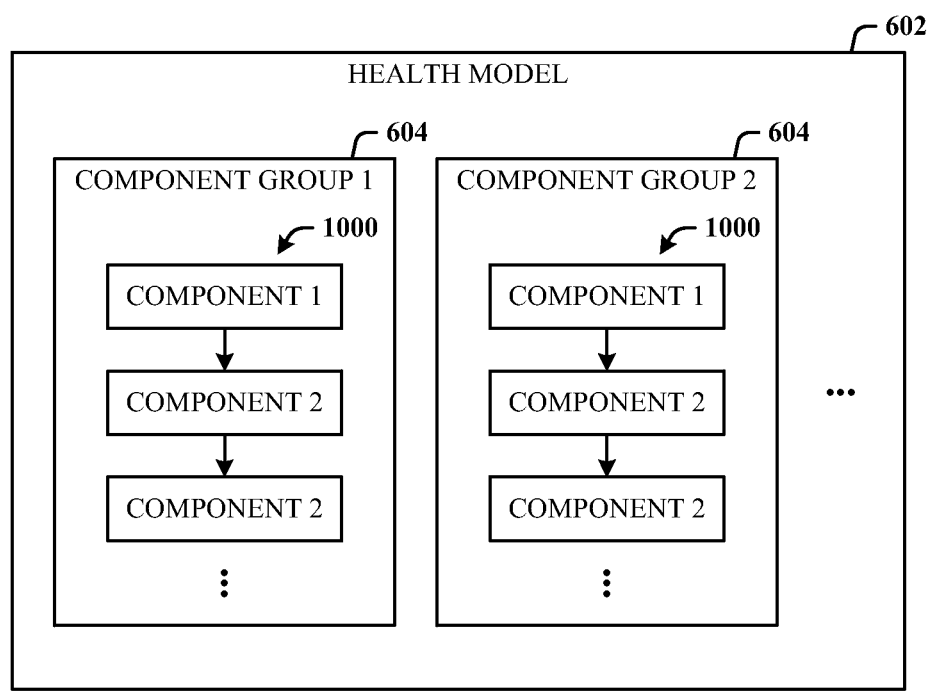
FIG. 10 illustrates exemplary aspects of a health model used with a computer-implemented diagnostic system.

FIG. 10 illustrates exemplary aspects of the health model 602 used with the computer-implemented diagnostic system 600. The health model 602 defines the hierarchy of related components 1000 within each of the component groups 604. This hierarchy represents dependency relationships between the related components 1000. In other words, a higher level related component within the hierarchy is dependent upon the lower level related components 1000. Thus, a problem arising at the lowest level component can create a cascade effect of problems that propagate upward through the hierarchy in each of the component groups 604.

As an example, if a higher level component depends on a lower level component to perform its designated function, the higher level component cannot meet its service level agreement if the lower level component is not healthy. There can be one or more factors that caused the lower level component to report a poor health indication, but it is sufficient for root cause analysis to simply establish whether the service agreement between each component in the hierarchy has been broken.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

Figure 11:
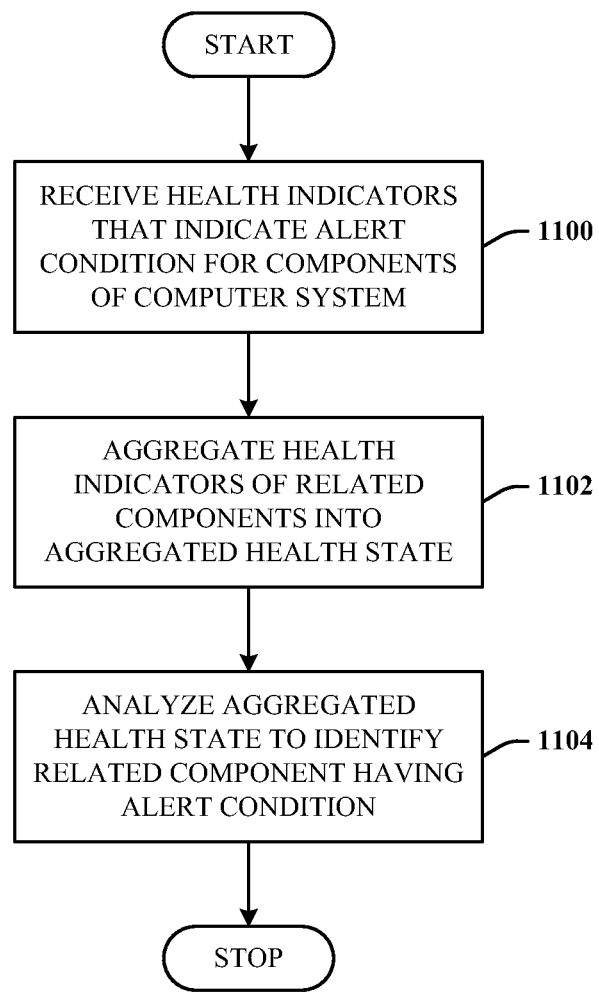
FIG. 11 illustrates an exemplary computer-implemented diagnostic method.

FIG. 11 illustrates a computer-implemented diagnostic method. At 1100, health indicators are received that indicate an alert condition for components of a computer system. At 1102, health indicators of related components are aggregated into an aggregated health state. This aggregation process can include receiving one or more alerts from the respective health indicators and generating a single alert for notification of the alert condition. At 1104, the aggregated health state is analyzed to identify a related component having the alert condition.

Figure 12:
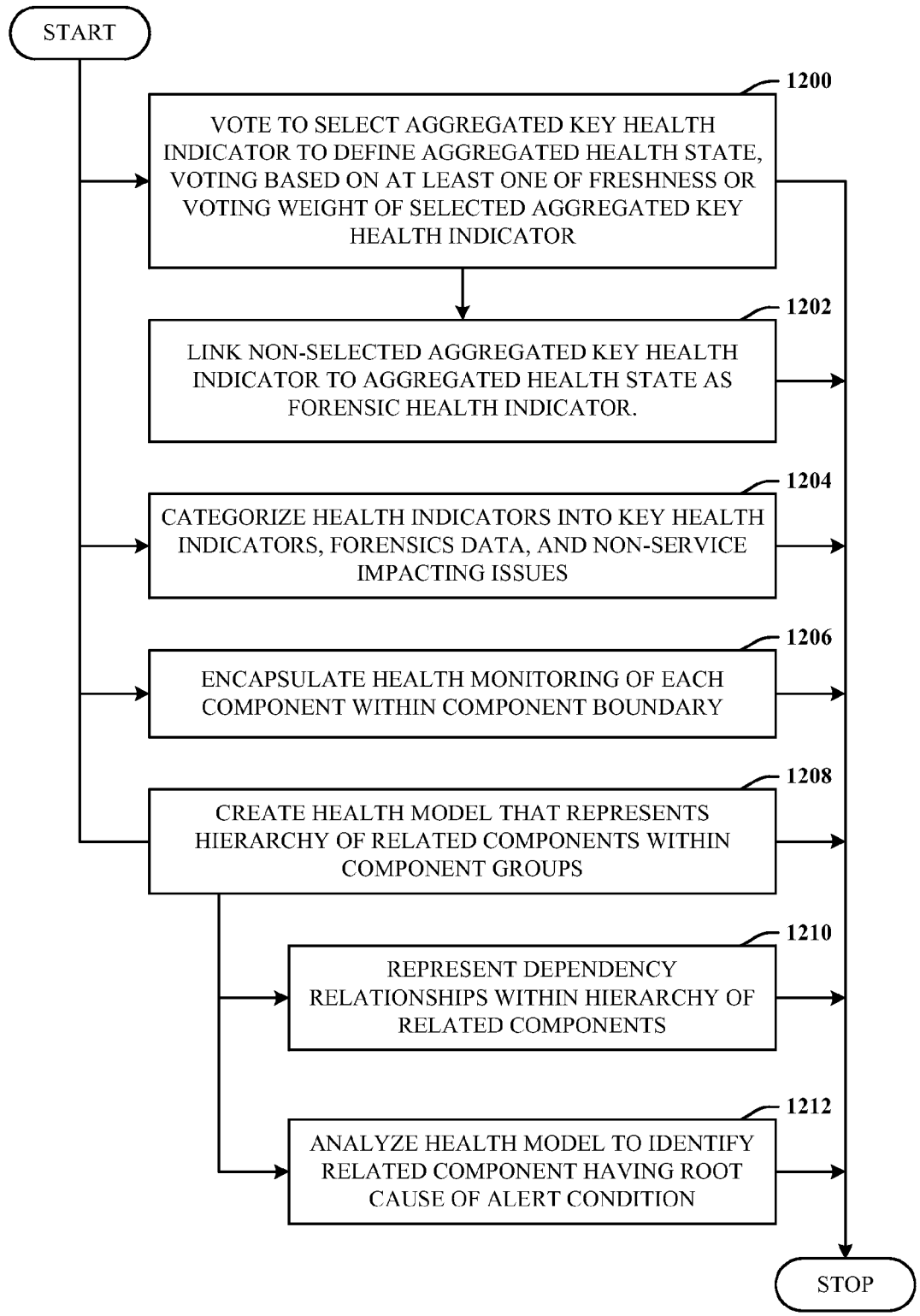
FIG. 12 illustrates further exemplary aspects in a computer-implemented diagnostic method.

FIG. 12 illustrates further exemplary aspects in the computer-implemented diagnostic method. At 1200, voting is performed to select an aggregated key health indicator to define the aggregated health state. The voting is based on a freshness of the selected aggregated key health indicator, alternatively or in combination with a voting weight of the selected aggregated key health indicator. At 1202, a non-selected aggregated key health indicator can optionally be linked to the aggregated health state as a forensic health indicator. At 1204, the health indicators can be categorized into key health indicators, forensics data, and non-service impacting issues. At 1206, the health monitoring of each component can be encapsulated within a component boundary.

At 1208, a health model can be created that represents a hierarchy of related components within component groups. This health model creation can include representing dependency relationships within the hierarchy of related components, as indicated at 1210. Additionally, as indicated at 1212, the health model can be analyzed to identify a related component having a root cause of the alert condition.

Figure 13:
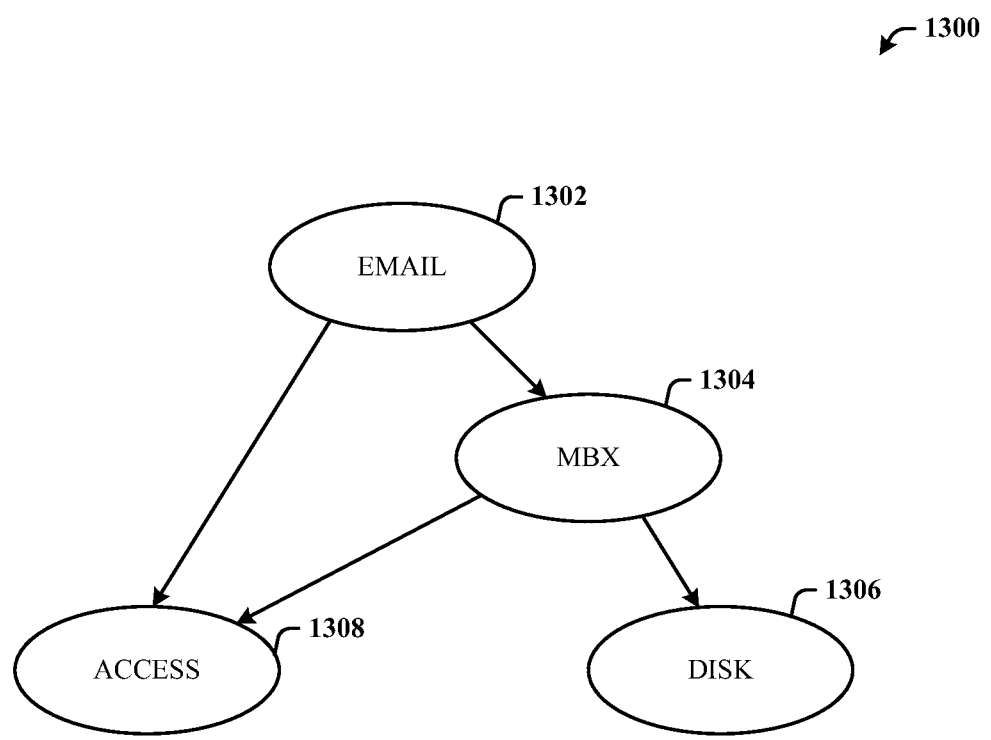
FIG. 13 illustrates a class hierarchy of components linked by dependency or containment relationships in a computer-implemented diagnostic system.

FIG. 13 illustrates a class hierarchy 1300 of components linked by dependency and/or containment relationships in a computer-implemented diagnostic system. By way of example, an email component 1302 depends on a mailbox component 1304 (e.g., mailbox server), which in turn depends on a disk 1306 (hard drive storage or other mass storage system). The email component 1302 and mailbox component 1304 also depend on an access server component 1308.

A first KHI of the email component 1302 issues an alert that connectivity failed, even though the access server component 1308 remains within its service level agreement. A second KHI for the email component 1302 issues an alert that average response time is greater than 120 seconds. A first KHI for the mailbox component 1304 (from which the email component 1302 depends) issues an alert that MAPI (message application programming interface) connectivity failed, while a second KHI issues an alert that log files cannot be written. Additionally, the forensic data is that the mailbox component 1304 failed to submit a message.

A first KHI for the disk 1306 issues an alert that the disk is full. However, a second KHI for the disk 1306 indicates that the associated (or related) disk controller succeeded, thereby not indicating an alert condition. The correlation component 108 thereby determines that the "disk full" condition is the root cause of the alert, that a disk failure caused the mailbox component 1304 to fail, which in turn caused the email component 1302 to fail.

The dependency links between EMAIL-MBX and MBX-DISK allow the correlation of the failures in the email component 1302, the mailbox component 1304, and the disk 1306, and thereby generate a single alert rather than three. The alert can be presented in the following form:

```
ALERT: KHI: disk is full
    IMPACT:
        MBX:
            KHI: test-MAPIConnectivity failed
            KHI: cannot write to log files
            Forensic: failed to submit message
            IMPACT:
                EMAIL:
                    KHI: test-EMAILConnectivity failed
                    KHI: average response time >120 seconds
```

Figure 14:
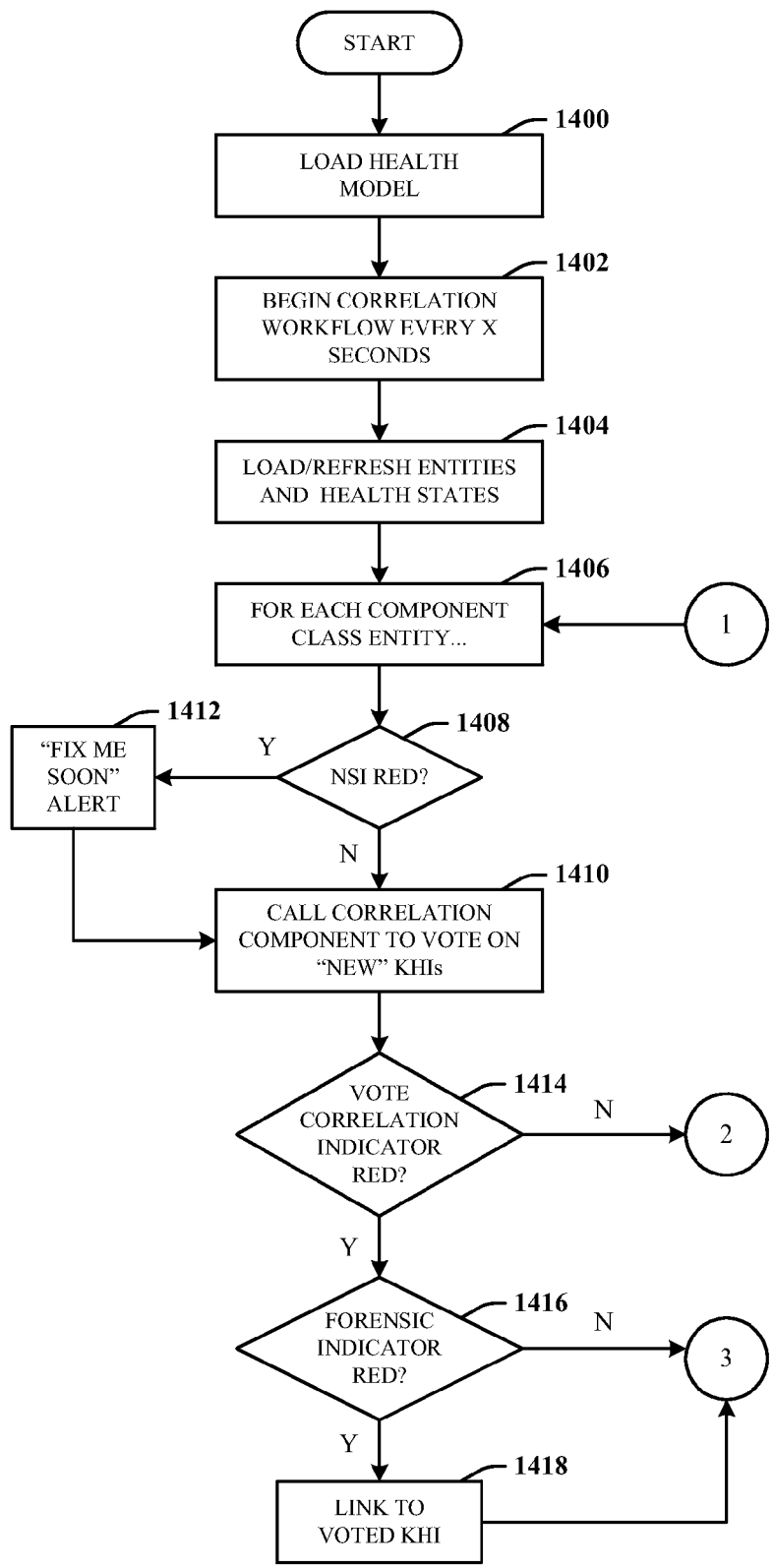
FIGS. 14, 15, and 16 illustrate a flow chart for an exemplary correlation algorithm in a computer-implemented diagnostic method, in which terminal numbers depict flow between elements in the flow chart.
Figure 15:
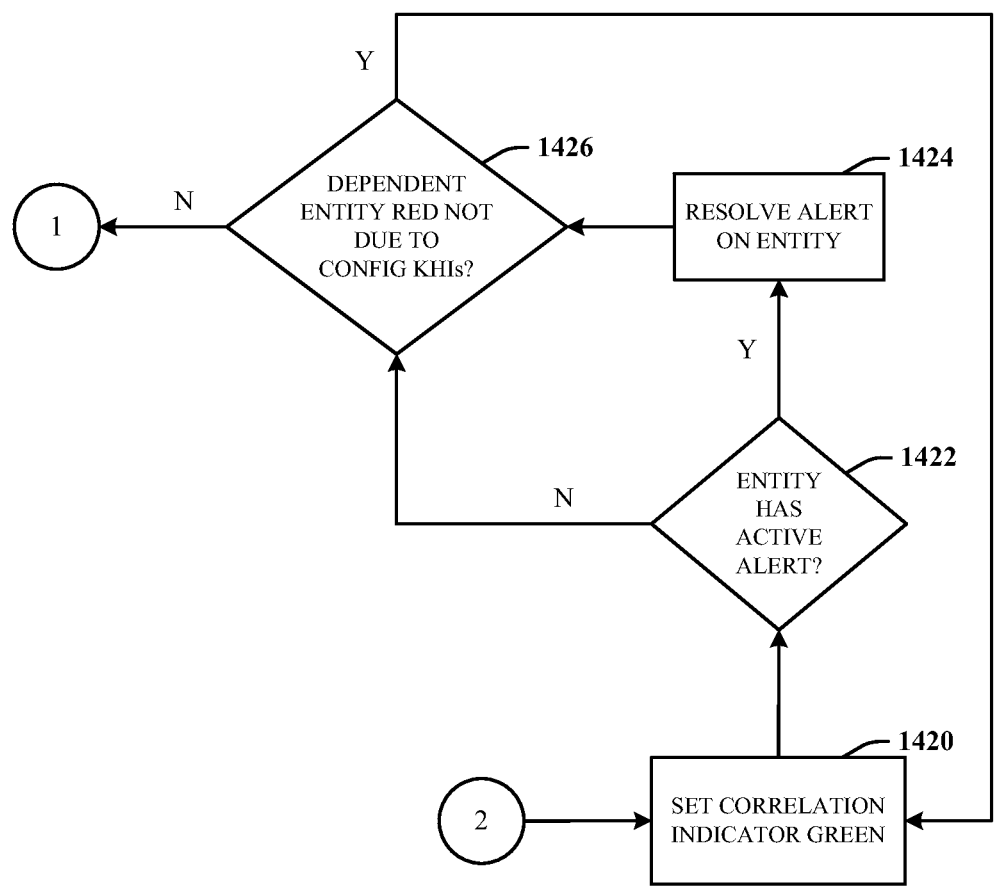
Figure 16:
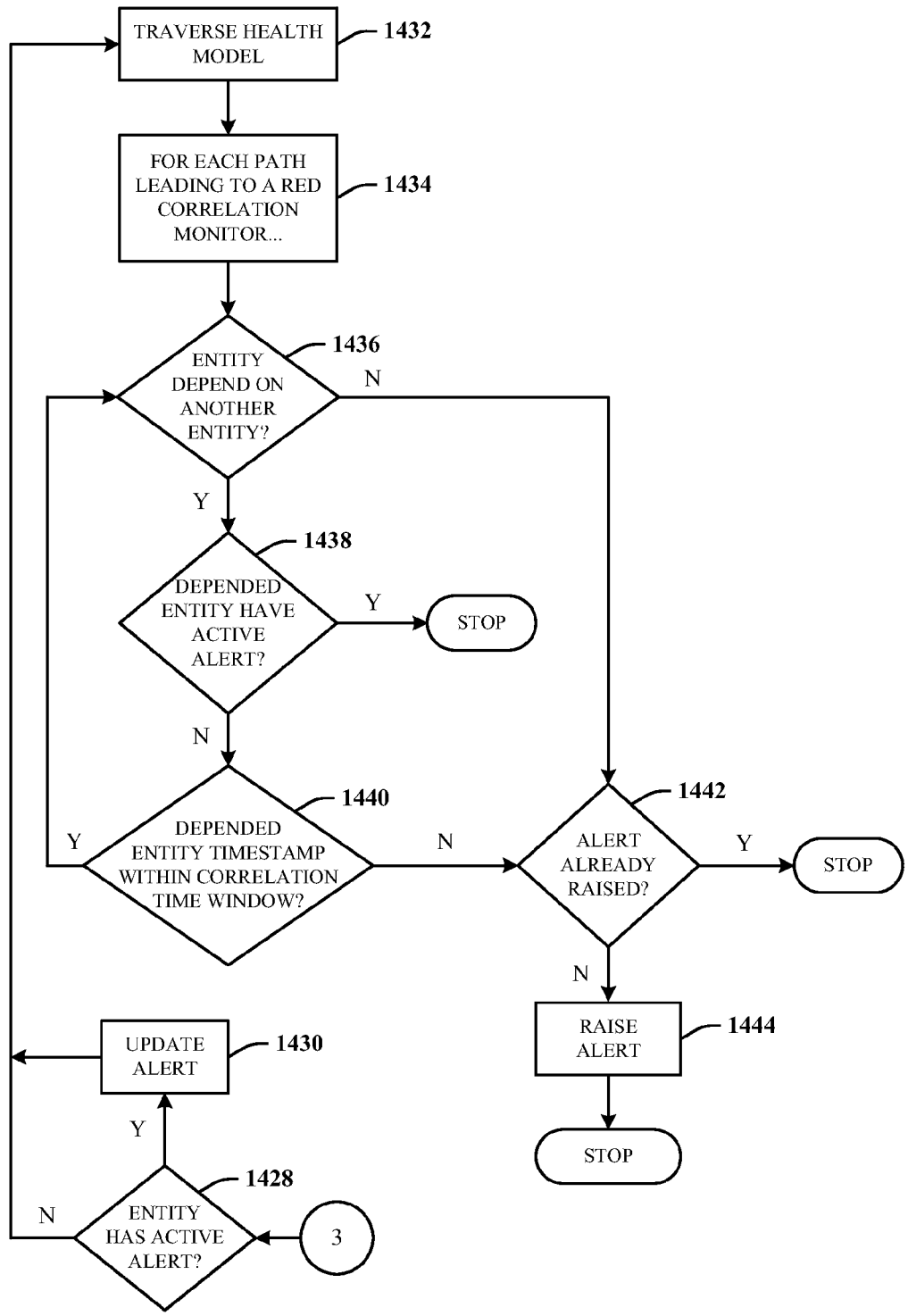

FIGS. 14, 15, and 16 illustrate a flow chart for an exemplary correlation algorithm in a computer-implemented diagnostic method, in which terminal numbers depict flow between elements in the flow chart. Referring to FIG. 14, at 1400, the correlation component first loads the health model. At 1402, correlation workflow begins every "x" number of seconds where the state of the health indicators is examined, to be categorized as KHIs, forensic data, or NSIs.

At 1404, the various entities and health states are loaded and/or refreshed, for each component class entity, as indicated at 1406. At 1408, a check is made as to whether any NSIs are "red," indicating an alert condition.

If no NSIs are red, flow is to 1410, where a correlation component is called to vote on "new" KHIs, in which KHIs within the boundary of each component are correlated. The voting component can run either a default voting algorithm or a custom voting algorithm to generate the aggregated health state of the component. If there are red NSIs, flow is from 1408 to 1412 to flag these NSIs as a "fix me soon" alert. Flow is then from 1412 to 1410.

At 1414, a check is made to determine if a vote correlation indicator is "red," indicating an alert condition. If no, the flow is to terminal bubble 2, which will be explained hereinbelow in connection with FIG. 15. If there is a red correlation vote indicator, flow is from 1414 to 1418 to check for a red forensic indicator, indicating an alert condition. If yes, forensic data is collected at 1418 within the same time window, as well as the contents of the "loser" KHIs, are linked to the "winner" KHI. After 1418, and if a red forensic data if found at 1416, flow is to terminal bubble 3, as will be explained hereinbelow in connection with FIG. 16.

Referring to FIG. 15, flow is received from terminal bubble 2, corresponding to a NO decision at 1414 of FIG. 14, indicating that a "red" vote correlation indicator was not found. Accordingly, at 1420, the correlation indicator is set to "green." At 1422, a check is made whether an entity has an active alert. If so, flow is to 1424 where the alert is resolved. If no entity has an active alert, flow is from 1422 to 1426 to check if a dependent entity is red not due to configuration KHIs. If so, the dependent entity is reset, and flow returns to 1420. If not, the flow is to terminal bubble 1, which returns to 1406 of FIG. 14. After resolving the alert at 1424, flow is also to 1426 to make the designated check.

Referring to FIG. 16, flow follows from terminal bubble 3 of FIG. 14. A check is made at 1428 as to whether an entity has an active alert. If so, the alert is updated with the new problems, as indicated at 1430. From 1430 and a NO decision at 1428, cause-impact correlation flow continues to 1432, where the health model DAG (directional acyclic diagram) is traversed from the root, to correlate the aggregated component health across each level.

At 1434, the correlation engine walks down through each entity dependency link, through each path leading to a "red" correlation indicator, alerting only on the entity at the lowest dependency level. At 1436, a check is made as to whether an entity depends on another entity. If so, flow is to 1438 where a check is made as to whether the depended entity has an active alert. If so, correlation flow ends as the lowest level component is reached and the problem is reported at this level.

If the depended entity does not have an active alert, flow is to 1440 to check if a timestamp of the depended entity is within the correlation time window. If so, flow returns to 1436, where the traverse is resumed and searching is continued for different problem paths.

If, at 1440, the timestamp of the depended entity is not within the correlation window, and the entity does not depend on another entity, as indicated at 1436, flow is to 1442, where a check is made as to whether an alert has already been raised. If so, correlation workflow ends. If no alert has already been raised, flow is from 1442 to 1444 where an alert is raised, after which correlation workflow ends.

Further to the example of FIG. 13, it may be the case that the access server component 1308 can be broken because of a configuration issue, and the mailbox component 1304 is down at the same time because of the aforementioned disk problem. In this situation, the correlation algorithm of FIGS. 14-16 reports the configuration issue as one issue, continues to traverse the health model, and reports the disk failure as another issue.

The correlation algorithm illustrates that only two settings are specified for the correlation to work: the hierarchy of dependency relationships between the components, and the categorization of the health indicators as KHIs, forensic data, or NSIs. In this way, a significant improvement is obtained over previous systems that require a number of rules to be written and maintained.

The hereinabove described correlation algorithm and the associated health model schema are thus advantageous in simplicity to understand, author, and maintain. Component operations need not be considered in order to perform correlations. Rather, correlations are enabled by simply defining the relationships among components, and categorizing the health indicators into KHIs, forensic data, or NSIs based on the SLAs of the components. The health aggregation within a component, the linking of forensic data to key health indicator alerts, and the root cause analysis will occur without creating correlation rules for all possible cause-impact combinations of individual health indicators within or cross component boundaries.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" can be used herein to mean serving as an example, instance, or illustration. Any aspect or design described herein as "exemplary" is not necessarily to be construed as preferred or advantageous over other aspects or designs.

Figure 17:
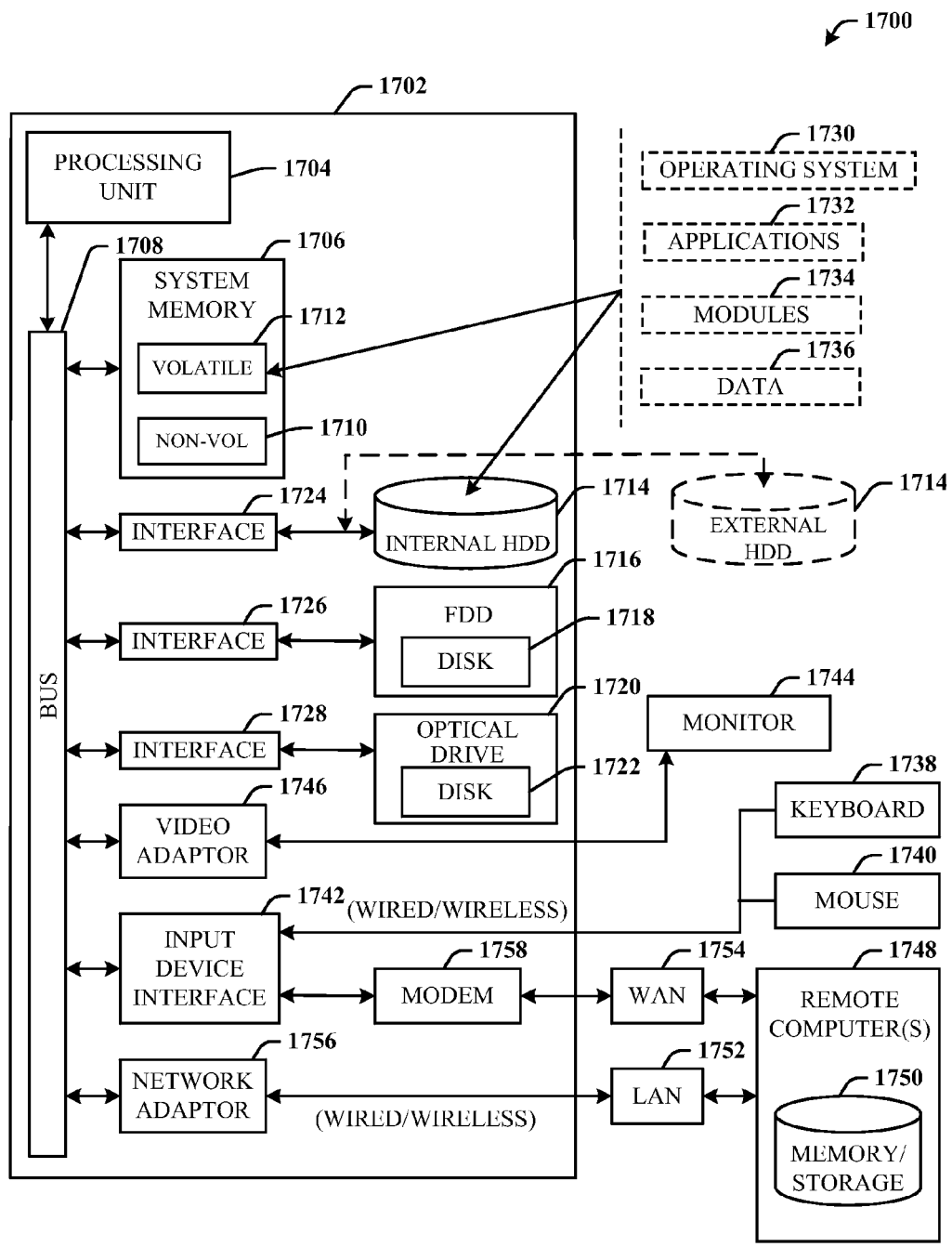
FIG. 17 illustrates a block diagram of a computing system operable to execute communications in accordance with the disclosed architecture.

Referring now to FIG. 17, there is illustrated a block diagram of a computing system 1700 operable to execute the computer-implemented diagnostic system 100 in accordance with the disclosed architecture. In order to provide additional context for various aspects thereof, FIG. 17 and the following discussion are intended to provide a brief, general description of a suitable computing system 1700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 17, the exemplary computing system 1700 for implementing various aspects includes a computer 1702 having a processing unit 1704, a system memory 1706 and a system bus 1708. The system bus 1708 provides an interface for system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 can include non-volatile memory (NON-VOL) 1710 and/or volatile memory 1712 (e.g., random access memory (RAM)). A basic input/output system (BIOS) can be stored in the non-volatile memory 1710 (e.g., ROM, EPROM, EEPROM, etc.), which BIOS are the basic routines that help to transfer information between elements within the computer 1702, such as during start-up. The volatile memory 1712 can also include a high-speed RAM such as static RAM for caching data.

The computer 1702 further includes an internal hard disk drive (HDD) 1714 (e.g., EIDE, SATA), which internal HDD 1714 can also be configured for external use in a suitable chassis, a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as a DVD). The HDD 1714, FDD 1716 and optical disk drive 1720 can be connected to the system bus 1708 by a HDD interface 1724, an FDD interface 1726 and an optical drive interface 1728, respectively. The HDD interface 1724 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette (e.g., FDD), and a removable optical media such as a CD or DVD, it can be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing novel methods of the disclosed architecture.

A number of program modules can be stored in the drives and volatile memory 1712, including an operating system 1730, one or more application programs 1732, other program modules 1734, and program data 1736. All or portions of the operating system, applications, modules, and/or data can also be cached in the volatile memory 1712. It is to be appreciated that the disclosed architecture can be implemented with various commercially available operating systems or combinations of operating systems.

The aforementioned application programs 1732, other program modules 1734, and program data 1736 can include the computer-implemented diagnostic system 100, the aggregation component 102, the health indicators 104, the aggregated health state 106, the correlation component 108, and the identified component 110 from FIG. 1, the voting component 200 and the selected health indicator 202 from FIG. 2, the forensic component 300, and the forensic data 302 from FIG. 3, the health model 400 and analysis component 402, for example.

The application programs 1732, other program modules 1734, and program data 1736 can also include the categorization component 500, the key health indicators 502, the forensic data 504, and the non-service impacting issues 506 from FIG. 5, the computer-implemented diagnostic system 600, the health model 602, and the component groups 604 from FIG. 6, the aggregated health indicators 700 from FIG. 7, the non-selected aggregated health indicator 800 from FIG. 8, the encapsulation component 900 and the component 902 from FIG. 9, and the hierarchy of related components 1000 from FIG. 10, for example.

A user can enter commands and information into the computer 1702 through one or more wire/wireless input devices, for example, a keyboard 1738 and a pointing device, such as a mouse 1740. Other input devices (not shown) can include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces such as a parallel port, IEEE 1394 serial port, a game port, a USB port, an IR interface, etc.

A monitor 1744 or other type of display device is also connected to the system bus 1708 via an interface, such as a video adaptor 1746. In addition to the monitor 1744, a computer typically includes other peripheral output devices (not shown), such as speakers, printers, etc.

The computer 1702 can operate in a networked environment using logical connections via wire and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wire/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which can connect to a global communications network, for example, the Internet.

When used in a LAN networking environment, the computer 1702 is connected to the LAN 1752 through a wire and/or wireless communication network interface or adaptor 1756. The adaptor 1756 can facilitate wire and/or wireless communications to the LAN 1752, which can also include a wireless access point disposed thereon for communicating with the wireless functionality of the adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wire and/or wireless device, is connected to the system bus 1708 via the input device interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 18:
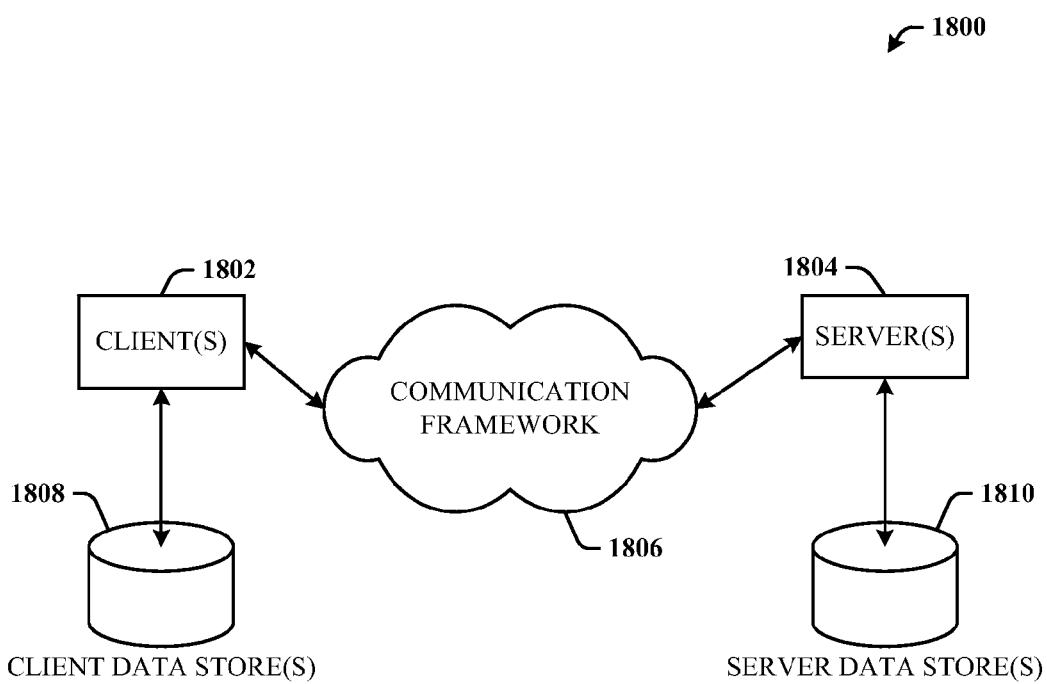
FIG. 18 illustrates an exemplary computing environment operable to execute a communications method.

Referring now to FIG. 18, there is illustrated a schematic block diagram of an exemplary computing environment 1800 that interacts with the computer-implemented diagnostic system 100. The environment 1800 includes one or more client(s) 1802. The client(s) 1802 can be hardware and/or software (e.g., threads, processes, computing devices). The client(s) 1802 can house cookie(s) and/or associated contextual information, for example.

The environment 1800 also includes one or more server(s) 1804. The server(s) 1804 can also be hardware and/or software (e.g., threads, processes, computing devices). The servers 1804 can house threads to perform transformations by employing the architecture, for example. One possible communication between a client 1802 and a server 1804 can be in the form of a data packet adapted to be transmitted between two or more computer processes. The data packet can include a cookie and/or associated contextual information, for example. The environment 1800 includes a communication framework 1806 (e.g., a global communication network such as the Internet) that can be employed to facilitate communications between the client(s) 1802 and the server(s) 1804.

Communications can be facilitated via a wire (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

What has been described above includes examples of the disclosed architecture. It is, of course, not possible to describe every conceivable combination of components and/or methodologies, but one of ordinary skill in the art can recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method, comprising:
in a health model representing a hierarchy of related components within component groups in a computer system, each component having at least one health indicator, wherein a health indicator is associated with a category including at least one of: a key health indicator (KHI), forensic data, and a non-service impacting issue (NSI):
selecting one of a plurality of KHIs for a component to be an aggregated KHI;
determining whether an alert condition exists for the aggregated KHI;
traversing the health model from a root to identify a path in the hierarchy having the alert condition;
determining that a first component in the path depends on a second component;
determining that the second component does not have an active alert and has a timestamp within a correlation time window; and
raising an alert for the second component.

2. The method of claim 1, comprising:
determining whether a NSI has an alert condition; and
raising a flag for the NSI.

3. The method of claim 1, comprising:
determining whether an alert condition exists for forensic data when an alert condition does exist for the aggregated KHI; and
collecting and linking the forensic data to the aggregated KHI when an alert condition does exist for the forensic data.

4. The method of claim 3, comprising:
collecting and linking the contents of non-selected KHIs to the aggregated KHI when an alert condition does exist for the forensic data.

5. The method of claim 1, comprising:
identifying, in the path having the alert, a component having the lowest dependency level;
determining whether an alert is already raised; and
raising an alert when an alert is not already raised.

6. The method of claim 1, wherein each health indicator comprises a vote of one of two possible conditions, the method comprising:
voting on which KHI to use as the aggregated KHI when a conflict among the KHI votes for a component exists.

7. A computer-implemented diagnostic apparatus, comprising:
a processor;
a health model executing on the processor to represent a hierarchy of related components within component groups in a computer system, each component having at least one health indicator, wherein a health indicator is associated with a category including at least one of: a key health indicator (KHI), forensic data, and a non-service impacting issue (NSI);
an aggregation component to select one of a plurality of KHIs for a component to be an aggregated KHI;
a correlation component to:
determine whether an alert condition exists for the aggregated KHI;
traversing the health model from a root to identify a path in the hierarchy having the alert condition;
determine that a first component in the path depends on a second component;
determine that the second component does not have an active alert and has a timestamp within a correlation time window; and
raise an alert for the second component.

8. The apparatus of claim 7, the correlation component to:
determine whether a NSI has an alert condition; and
raise a flag for the NSI.

9. The apparatus of claim 7, the correlation component to:
determine whether an alert condition exists for forensic data when an alert condition does exist for the aggregated KHI; and
collect and link the forensic data to the aggregated KHI when an alert condition does exist for the forensic data.

10. The apparatus of claim 9, the correlation component to:
collect and link the contents of non-selected KHIs to the aggregated KHI when an alert condition does exist for the forensic data.

11. The apparatus of claim 7, the correlation component to:
identify, in the path having the alert, a component having the lowest dependency level;
determine whether an alert is already raised; and
raise an alert when an alert is not already raised.

12. The apparatus of claim 7, wherein each health indicator comprises a vote of one of two possible conditions, the aggregation component to:
vote on which KHI to use as the aggregated KHI when a conflict among the KHI votes for a component exists.

13. A computer-readable memory storage device comprising instructions that, when executed by a computing device, cause the computing device to:
receive health indicators that indicate an alert condition for components of a computer system, the health indicators representing health of components;
aggregate health indicators of related components into an aggregated health state;
vote to select a health indicator based on voting weight from the aggregated health indicators to determine which one health indicator defines the aggregated health state, wherein voting weight represents a relative importance of health indicators;
link a non-selected key health indicator of the aggregated health indicators to the selected health indicator as a forensic health indicator; and
analyze the aggregated health state to identify a related component having the alert condition.

14. The computer-readable memory storage device of claim 13, wherein a health indicator is associated with a category including at least one of: a key health indicator (KHI), forensic data, and a non-service impacting issue (NSI), the storage device further comprising instructions that, when executed by the computing device, cause the computing device to:
represent, in a health model, a hierarchy of related components within component groups in a computer system, each component having at least one health indicator,
select one of a plurality of KHIs for a component to be an aggregated KHI;
determine whether an alert condition exists for the aggregated KHI;
traverse the health model from a root to identify a path in the hierarchy having the alert condition;
determine that a first component in the path depends on a second component;
determine that the second component does not have an active alert and has a timestamp within a correlation time window; and
raise an alert for the second component.

15. The computer-readable memory storage device of claim 13, further comprising instructions that, when executed by the computing device, cause the computing device to:
determine whether a NSI has an alert condition; and
raise a flag for the NSI.

16. The computer-readable memory storage device of claim 13, further comprising instructions that, when executed by the computing device, cause the computing device to:
determine whether an alert condition exists for forensic data when an alert condition does exist for the aggregated KHI; and
collect and link the forensic data to the aggregated KHI when an alert condition does exist for the forensic data.

17. The computer-readable memory storage device of claim 16, further comprising instructions that, when executed by the computing device, cause the computing device to:
collect and link the contents of non-selected KHIs to the aggregated KHI when an alert condition does exist for the forensic data.

18. The computer-readable memory storage device of claim 13, further comprising instructions that, when executed by the computing device, cause the computing device to:
identify, in the path having the alert, a component having the lowest dependency level;
determine whether an alert is already raised; and
raise an alert when an alert is not already raised.

19. The computer-readable memory storage device of claim 13, wherein each health indicator comprises a vote of one of two possible conditions, further comprising instructions that, when executed by the computing device, cause the computing device to:
vote on which KHI to use as the aggregated KHI when a conflict among the KHI votes for a component exists.

* * * * *